(12) United States Patent
Zhang et al.

(10) Patent No.: US 11,914,675 B2
(45) Date of Patent: Feb. 27, 2024

(54) IMAGE PROCESSING METHOD, APPARATUS, COMPUTER DEVICE AND STORAGE MEDIUM

(71) Applicant: BOE TECHNOLOGY GROUP CO., LTD., Beijing (CN)

(72) Inventors: Guolin Zhang, Beijing (CN); Kaiqin Xu, Beijing (CN); Jiahong Zou, Beijing (CN); Quanguo Zhou, Beijing (CN); Xun Huang, Beijing (CN); Hongxiang Shen, Beijing (CN); Jiuyang Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 139 days.

(21) Appl. No.: 17/507,918

(22) Filed: Oct. 22, 2021

(65) Prior Publication Data

US 2022/0269901 A1 Aug. 25, 2022

(30) Foreign Application Priority Data

Feb. 23, 2021 (CN) .......................... 202110201219.8

(51) Int. Cl.
*G06V 10/74* (2022.01)
*G06F 18/22* (2023.01)
*G06V 10/40* (2022.01)

(52) U.S. Cl.
CPC ............. *G06F 18/22* (2023.01); *G06V 10/40* (2022.01); *G06V 10/761* (2022.01)

(58) Field of Classification Search
CPC ...... G06F 18/22; G06V 10/40; G06V 10/761; G06V 10/443; G06T 7/0004; G06T 7/11; G06T 7/90; G06T 2207/30121; G06T 2207/30168
See application file for complete search history.

(56) References Cited

U.S. PATENT DOCUMENTS

| 6,351,556 | B1 * | 2/2002 | Loui .......................... G06T 7/00 382/164 |
| 9,719,777 | B1 * | 8/2017 | Colonna de Lega ........................ G01B 9/02083 |
| 11,532,111 | B1 * | 12/2022 | Zhang ...................... G10L 15/26 |
| 2003/0091235 | A1 * | 5/2003 | Xiong .................... G06F 16/785 382/199 |
| 2004/0263859 | A1 * | 12/2004 | Chang ................ G01B 9/02091 356/497 |

(Continued)

*Primary Examiner* — Aaron W Carter
(74) *Attorney, Agent, or Firm* — DINSMORE & SHOHL LLP

(57) ABSTRACT

An image processing method includes: receiving a processing instruction for an image; screening out a plurality of target images from a plurality of acquired images; determining a first feature value and a second feature value of the target area of each of the target images; determining a similarity between the first feature values of the target areas in every two target images according to all the determined first feature values, and determining a similarity between the second feature values of the target areas in every two target images according to all the determined second feature values; and, if a first target similarity is within a first preset range, and a second target similarity is within a second preset range, determining that a first image and a second image belong to the same image set.

16 Claims, 5 Drawing Sheets

(56) References Cited

U.S. PATENT DOCUMENTS

| | | | | |
|---|---|---|---|---|
| 2008/0292273 | A1* | 11/2008 | Wang | H04N 5/76 |
| | | | | 386/249 |
| 2009/0073459 | A1* | 3/2009 | Ge | G01J 9/02 |
| | | | | 356/521 |
| 2009/0180680 | A1* | 7/2009 | Satou | G06T 7/001 |
| | | | | 382/144 |
| 2014/0037216 | A1* | 2/2014 | Kumar | G06V 10/7715 |
| | | | | 382/197 |
| 2014/0226150 | A1* | 8/2014 | Colonna de Lega | |
| | | | | G01B 9/02087 |
| | | | | 356/73 |
| 2015/0086067 | A1* | 3/2015 | Mehta | G06T 1/0071 |
| | | | | 382/100 |
| 2015/0279027 | A1* | 10/2015 | Nagai | H04N 5/32 |
| | | | | 382/132 |
| 2015/0317771 | A1* | 11/2015 | Kato | A61B 6/4233 |
| | | | | 378/62 |
| 2016/0162755 | A1* | 6/2016 | Nagai | G01B 11/254 |
| | | | | 382/190 |
| 2016/0217338 | A1* | 7/2016 | Li | G06V 20/40 |
| 2017/0023683 | A1* | 1/2017 | Nagai | G06T 5/20 |
| 2017/0124427 | A1* | 5/2017 | Park | G06F 18/232 |
| 2019/0049237 | A1* | 2/2019 | Watanabe | G01B 11/2441 |
| 2020/0126202 | A1* | 4/2020 | Huang | G06T 7/001 |
| 2021/0049406 | A1* | 2/2021 | Lu | G06F 18/22 |
| 2021/0358523 | A1* | 11/2021 | Zou | G06V 10/44 |
| 2022/0084308 | A1* | 3/2022 | Kuang | G06V 10/757 |
| 2022/0269901 | A1* | 8/2022 | Zhang | G06V 10/40 |
| 2023/0051411 | A1* | 2/2023 | Chen | G06V 10/761 |

* cited by examiner

IMAGE PROCESSING METHOD, APPARATUS, COMPUTER DEVICE AND STORAGE MEDIUM

CROSS-REFERENCE TO RELATED APPLICATIONS

This application claims the priority of Chinese Patent Application No. 202110201219.8 entitled "AN IMAGE PROCESSING METHOD, APPARATUS, COMPUTER DEVICE AND STORAGE MEDIUM" filed on Feb. 23, 2021, the disclosure of which is incorporated herein by reference in its entirety.

TECHNICAL FIELD

The present disclosure relates to the field of computer, and in particular to an image processing method, apparatus, computer device and storage medium.

BACKGROUND

In the manufacturing procedure of a backplane of a display panel, AOI (auto optical inspection) is usually employed to monitor individual processes of the manufacturing procedure to facilitate the detection of defects in individual processes. Wherein, the data output by auto optical inspection is images. For example, a camera can be employed to capture defective images; then deep learning technology is employed to perform image identification on these defective images to determine characteristic information of the defective images so as to improve the quality and yield of display panels during subsequent manufacturing of display panels.

What deep learning technology employs is neural network algorithms. Neural network algorithms usually require a large number of high-quality images as samples to train neural network models to ensure that the models can move towards correct direction of convergence. Wherein, high-quality images can be obtained by image data processing.

At present, data processing on images mainly employs the way of manual processing. However, manual processing relies on the judgment of operator on a large amount of image data, thus its implementation is complicated, time-consuming, and may also cause processing results inconsistent due to different operators.

SUMMARY

Embodiments of the present disclosure provide an image processing method, apparatus, computer device, and storage medium, which can solve problems of low image processing efficiency and low image processing accuracy.

In order to achieve foregoing objectives, embodiments of the present disclosure adopt following technical solutions:

In a first aspect, there is provided an image processing method comprising: receiving a processing instruction for an image; screening out a plurality of target images from a plurality of acquired images, the target image being an image including a target area; the target area including an area in the target image where pixel information is non-periodic; determining a first feature value and a second feature value of the target area of each of the target images; determining a similarity between the first feature values of the target areas in every two target images according to all the determined first feature values, and determining a similarity between the second feature values of the target areas in every two target images according to all the determined second feature values; and if a first target similarity, which is the similarity between the first feature values of the target areas in a first image and a second image, is within a first preset range, and a second target similarity, which is the similarity between the second feature values of the target areas in the first image and the second image, is within a second preset range, determining that the first image and the second image belong to the same image set.

Based on the first aspect, after receiving the processing instruction, the image processing apparatus screens out the plurality of target images, and determines the first feature value and the second feature value of the target area of each target image, and then determines a similarity between the first feature values of the target areas in every two target images according to all the first feature values, and determines a similarity between the second feature values of the target areas in every two target images according to all the determined second feature values, and, if a first target similarity is within the first preset range, and a second target similarity is within the second preset range, determines that the first image and the second image belong to the same set. As it can be seen, the image processing method provided by an embodiment of the present disclosure replaces the way of manual processing, thereby improving the accuracy of image processing and the efficiency of image processing.

Alternatively, the image processing method further comprises: determining an identification for the image set.

Based on this alternative manner, the image processing apparatus can identify the image set, which can not only distinguish each image set, but also can display features of target images in each image set intuitively through the identification.

Alternatively, the screening out a plurality of target images from a plurality of acquired images comprises: acquiring the pixel information of each image; determining an interference fringe of the image according to the pixel information, and filtering out the interference fringe to obtain a filtered image; and if the filtered image includes the area where the pixel information is non-periodic, determining the image as the target image.

Based on this alternative manner, the image processing apparatus can determine the interference fringe according to the pixel information, and filter out the interference fringe to obtain a filtered image; and if the filtered image includes an area where the pixel information is non-periodic, that is, there is a defective area in the filtered image, determines the image as the target image. Since the area in the image where the pixel information is non-periodic can be clearly seen after the interference fringe is filtered out, the affect of the interference fringe on the screened target image is avoided, thereby helping for improving the accuracy of screening out the target image.

Alternatively, the image processing apparatus determining a similarity between the first feature values of the target areas in every two target images according to all the determined first feature values comprises: for image A and image B, according to the first feature value of the target area in the image A and the first feature value of the target area in the image B, determining a similarity between the first feature values of the target areas in the image A and the image B to satisfy following formula:

$$S_\alpha = \frac{\sum_{i=1,j=1}^{z} A_i B_j}{\sqrt{\sum_{i=1}^{z} A_i^2} \sqrt{\sum_{j=1}^{z} B_j^2}};$$

wherein, $A_i$ represents the i-th first feature value of the image A, $B_j$ represents the j-th first feature value of the image B, $1 \le i \le z$, $1 \le j \le z$;

$$\sum_{i=1,j=1}^{z} A_i B_j$$

represents the sum of z first feature values of the image A and z first feature values of the image B;

$$\sqrt{\sum_{i=1}^{z} A_i^2}$$

represents the arithmetic square root of the sum of z first feature values of the image A, $$\sqrt{\sum_{j=1}^{z} B_j^2}$$

represents the arithmetic square root of the sum of z first feature values of the image B, and $S_\alpha$ is the similarity between the first feature values of the target areas in the image A and the image B.

Based on this alternative manner, since the similarity between the first feature values of the target areas in every two target images satisfies the above formula, the calculated similarity between the first feature values is more accurate.

Alternatively, the image processing apparatus determining a similarity between the second feature values of the target areas in every two target images according to all the determined second feature values comprises: for image A and image B, according to the second feature value of the target area in the image A and the second feature value of the target area in the image B, determining a similarity between the second feature values of the target areas in the image A and the image B to satisfy following formula:

$$S_\beta = \frac{\sum_{n=1,m=1}^{k} A_n B_m}{\sqrt{\sum_{n=1}^{k} A_n^2} \sqrt{\sum_{m=1}^{k} B_m^2}};$$

wherein, $A_n$ represents the n-th second feature value of the image A, $B_m$ represents the m-th second feature value of the image B, $1 \le n \le k$, $1 \le m \le k$;

$$\sum_{n=1,m=1}^{k} A_n B_m$$

represents the sum of k second feature values of the image A and k second feature values of the image B;

$$\sqrt{\sum_{n=1}^{k} A_n^2}$$

represents the arithmetic square root of the sum of k second feature values of the image A, $$\sqrt{\sum_{m=1}^{k} B_m^2}$$

represents the arithmetic square root of the sum of k second feature values of the image B, and $S_\beta$ is the similarity between the second feature values of the target areas in the image A and the image B.

Based on this alternative manner, since the similarity between the second feature values of the target areas in every two target images satisfies the above formula, the calculated similarity between the second feature value is more accurate.

In a second aspect, there is provided an image processing apparatus, which can implement functions performed by the image processing method in the above first aspect or the alternative manners of the first aspect, and the functions can be implemented by hardware executing corresponding software. The hardware or software includes one or more modules corresponding to above functions. Such as a receiving module and a processing module. Specifically, the receiving module is configured to receive a processing instruction for an image; the processing module is configured to screen out a plurality of target images from a plurality of acquired images; wherein the target image is an image including a target area; the target area includes an area in the target image where pixel information is non-periodic; and wherein the processing module is further configured to determine a first feature value and a second feature value of the target area of each of the target images; the processing module is further configured to determine a similarity between the first feature values of the target areas in every two target images according to all the determined first feature values, and determine a similarity between the second feature values of the target areas in every two target images according to all the determined second feature values; and, the processing module is further configured to, if a first target similarity, which is the similarity between the first feature values of the target areas in a first image and a second image, is within a first preset range, and a second target similarity, which is the similarity between the second feature values of the target areas in the first image and the second image, is within a second preset range, determine that the first image and the second image belong to the same image set.

Alternatively, the image processing apparatus further comprises a determining module; wherein the determining module is configured to determine an identification for the image set.

Alternatively, the processing module is further configured to acquire the pixel information of each image; determine an interference fringe of the image according to the pixel information, and filtering out the interference fringe to obtain a filtered image; and if the filtered image includes the area where the pixel information is non-periodic, determine the image as the target image.

Alternatively, the processing module is further configured to, for image A and image B, according to the first feature value of the target area in the image A and the first feature value of the target area in the image B, determine a similarity between the first feature values of the target areas in the image A and the image B to satisfy following formula:

$$S_\alpha = \frac{\sum_{i=1,j=1}^{z} A_i B_j}{\sqrt{\sum_{i=1}^{z} A_i^2} \sqrt{\sum_{j=1}^{z} B_j^2}};$$

wherein, $A_i$ represents the i-th first feature value of the image A, $B_j$ represents the j-th first feature value of the image B, $1 \leq i \leq z$, $1 \leq j \leq z$;

$$\sum_{i=1,j=1}^{z} A_i B_j$$

represents the sum of z first feature values of the image A and z first feature values of the image B;

$$\sqrt{\sum_{i=1}^{z} A_i^2}$$

represents the arithmetic square root of the sum of z first feature values of the image A, $$\sqrt{\sum_{j=1}^{z} B_j^2}$$

represents the arithmetic square root of the sum of z first feature values of the image B, and $S_\alpha$ is the similarity between the first feature values of the target areas in the image A and the image B.

Alternatively, the processing module is further configured to, for image A and image B, according to the second feature value of the target area in the image A and the second feature value of the target area in the image B, determine a similarity between the second feature values of the target areas in the image A and the image B to satisfy following formula:

$$S_\beta = \frac{\sum_{n=1,m=1}^{k} A_n B_m}{\sqrt{\sum_{n=1}^{k} A_n^2} \sqrt{\sum_{m=1}^{k} B_m^2}};$$

wherein, $A_n$ represents the n-th second feature value of the image A, $B_m$ represents the m-th second feature value of the image B, $1 \leq n \leq k$, $1 \leq m \leq k$;

$$\sum_{n=1,m=1}^{k} A_n B_m$$

represents the sum of k second feature values of the image A and k second feature values of the image B;

$$\sqrt{\sum_{n=1}^{k} A_n^2}$$

represents the arithmetic square root of the sum of k second feature values of the image A, $$\sqrt{\sum_{m=1}^{k} B_m^2}$$

represents the arithmetic square root of the sum of k second feature values of the image B, and $S_\beta$ is the similarity between the second feature values of the target areas in the image A and the image B.

In a third aspect, there is provided a computer device, which can be a computer device or a chip or a system-on-chip in a computer device. The computer device can implement functions performed by the image processing apparatus in the above aspects or the alternative manners, and the functions can be implemented by hardware and software.

Alternatively, the computer device can comprise: a processor and a memory; the processor being coupled with the memory. The memory is used to store computer program code, which includes computer instructions. When the processor executes the computer instructions, the computer device executes the image processing method according to the first aspect and any one of alternatives thereof.

In a fourth aspect, there is provided a non-transitory computer-readable storage medium having computer instructions or a program stored thereon. The instructions in the computer-readable storage medium, when being executed by a processor of a computer device, cause the computer device to perform the image processing method according to the first aspect or any one of alternatives of the first aspect.

Ina fifth aspect, there is provided a computer program product including computer instructions, which, when being executed by a computer device, cause the computer device to implement the image processing method according to the first aspect or any one of alternatives of the first aspect.

In a sixth aspect, there is provided an image processing system including the image processing apparatus as described in the above second aspect.

The technical solutions provided by the embodiments of the present disclosure at least bring following beneficial effects:

Based on any of above aspects, in the present disclosure, after receiving a processing instruction, an image processing apparatus screens out a plurality of target images, determines a first feature value and a second feature value of the target area of each target image, and then determines a similarity between the first feature values of the target areas in every two target images according to all the first feature values, and determines a similarity between the second feature values of the target areas in every two target images according to all the determined second feature values, and if the first target similarity is within a first preset range, and the second target similarity is within a second preset range, determines that the first image and the second image belong to the same set. As it can be seen, the image processing method provided by the disclosed embodiment replaces the way of manual processing, thereby improving the accuracy of image processing and the efficiency of image processing.

It should be understood that the above general description and the following detailed description are only exemplary and explanatory, and cannot limit the present disclosure.

BRIEF DESCRIPTION OF THE DRAWINGS

In order to more clearly describe technical solutions of the embodiments of the present disclosure, hereinafter the drawings will be briefly introduced that need to be used in the description of the embodiments or the prior art. It is apparent that, the drawings in the following description are only some embodiments of the present disclosure, and for those of ordinary skill in the art, other drawings can be obtained according to these drawings without having creative work.

DETAILED DESCRIPTION

Figure 1:
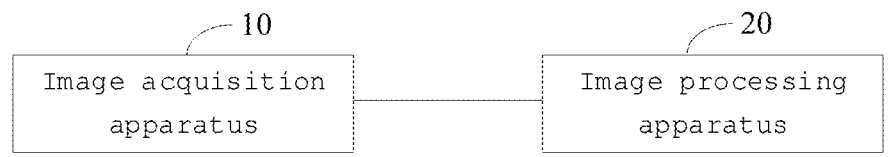
FIG. 1 shows an image processing system according to an exemplary embodiment.

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without having creative work shall fall within the protection scope of the present disclosure.

In the description of the present disclosure, it should be understood that the orientation or positional relationship indicated by terms "center", "upper", "lower", "front", "rear", "left", "right", "vertical", "horizontal", "top", "bottom", "inner", "outer", etc. is the orientation or positional relationship shown based on the drawings, and is only for the convenience of describing the present disclosure and simplifying the description, rather than indicating or implying the referred apparatus or elements must have a specific orientation, be configured and operated in a specific orientation, and therefore cannot be understood as a limitation to the present disclosure.

Unless the context requires otherwise, throughout the specification and claims, the term. "comprise" and other forms thereof such as the third-person singular form "comprises" and the present participle form "comprising" are interpreted as open and inclusive, which means "including, but not limited to." In the description of the specification, the terms "one embodiment", "some embodiments", "exemplary embodiments", "example", "specific example" or "some examples" etc. are intended to indicate that a specific feature, structure, material, or characteristic related to the embodiment or example is included in at least one embodiment or example of the present disclosure. The schematic representations of the above terms do not necessarily refer to the same embodiment or example. In addition, the specific feature, structure, material, or characteristics may be included in any one or more embodiments or examples in any suitable manner.

Hereinafter, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. In the description of the embodiments of the present disclosure, unless otherwise specified, "a plurality of" means two or more.

In describing some embodiments, the expressions "coupled" and "connected" and their derivatives may be used. For example, the term "connected" may be used when describing some embodiments to indicate that two or more components are in direct physical or electrical contact with each other. As another example, the term "coupled" may be used when describing some embodiments to indicate that two or more components have direct physical or electrical contact. However, the term "coupled" or "communicatively coupled" may also mean that two or more components are not in direct contact with each other, but still cooperate or interact with each other. The embodiments disclosed here are not necessarily limited to the content herein.

"At least one of A, B, and C" has the same meaning as "at least one of A, B, or C", and both include the following combinations of A, B, and C: only A, only B, only C, the combination of A and B, the combination of A and C, the combination of B and C, and the combination of A, B and C.

"A and/or B" includes following three combinations: only A, only B, and the combination of A and B.

"A plurality of" means at least two.

The use of "applicable to" or "configured to" herein means open and inclusive language, which does not exclude devices applicable to or configured to perform additional tasks or steps.

In addition, the use of "based on" means open and inclusive, because processes, steps, calculations or other actions "based on" one or more of stated conditions or values may be based on additional conditions or exceed the stated values in practice.

As used herein, "about" or "approximately" includes the stated value as well as an average value within an acceptable deviation range of a specified value, where the acceptable deviation range is determined by those of ordinary skill in the art in view of the measurement under discussion and the error associated with the measurement of a specific quantity (i.e., limitations of the measurement system).

The exemplary implementations are described herein with reference to cross-sectional views and/or plan views as idealized exemplary drawings. In the drawings, the thickness of layers and regions are exaggerated for clarity. Therefore, variations in shapes with respect to the drawings due to, for example, manufacturing technology and/or tolerances can be envisaged. Therefore, the exemplary implementations should not be construed as being limited to the shapes of the areas shown herein, but include shape deviations due to, for example, manufacturing. For example, the etched area shown as a rectangle will generally have a curved feature. Therefore, the areas shown in the drawings are schematic in nature, and their shapes are not intended to show actual shapes of the areas of the device, and are not intended to limit the scope of the exemplary implementations.

The image processing methods provided by related technologies mainly adopt the way of manual processing, which tends to lack a unified and standard processing flow, resulting the way of manual processing mainly having following problems:

1. The way of manual processing relies on a judgment of an operator on the data, and after the judgment, further processing needs to be completed, which causes the image processing long time-consuming.
2. When an operator is processing a large amount of image data, images might be omitted due to certain reasons, resulting in some images not being processed.
3. Results of image processing may be inconsistent due to different operators.
4. In order to ensure the accuracy of the processing, after the image processing is completed, the processing results need to be statistically re-checked, which is time-consuming and labor-intensive.

In order to solve above problems, the embodiments of the present disclosure provide an image processing method applied in a computer device. The processing method replaces the way of manual processing, thereby improving the accuracy of image processing and the efficiency of image processing.

First, application scenarios of the image processing method provided by the embodiments of the present disclosure are described: in the manufacturing procedure of the display substrate, products obtained from some processes (at least one process) need to be inspected to determine information such as whether the display substrate has a defect, the type of the defect, or the like. In a specific implementation, inspection is to obtain an image after completing at least one process in the manufacturing procedure of the display substrate and then process the image to determine information such as defect type of the display substrate etc.

In an embodiment of the present disclosure, a display substrate may be a related product of a display apparatus, that is, a product obtained after at least one process being completed in the procedure of preparing the display apparatus.

The display apparatus may be an LCD (Liquid Crystal Display) apparatus; it may also be a self-luminous display apparatus, such as an OLED (Organic Light Emitting Diode) display apparatus, QLED (Quantum Dot Light Emitting Diodes) display apparatus, Micro LED (Micro Light-Emitting Diode), etc. Illustratively, the display apparatus includes an array substrate. In LCD, the array substrate can be called a TFT array substrate; and in OLED, QLED, Micro LED, etc., the array substrate may be a driving backplane including pixel circuits.

On this basis, as an example, in an LCD display apparatus, the display substrate may be a TFT array substrate or a pair of cassettes substrate; and in a self-luminous display apparatus, the display substrate may be a driving backplane.

In an embodiment of the present disclosure, an image refers to an image of a product obtained after at least one process being completed in the procedure of generation of a display substrate; specifically, it may refer to the substrate obtained by forming at least one pattern layer on a substrate. The pattern layer refers to a pattern formed on the substrate through a patterning process.

For example, the process of preparing a display substrate included in an LCD can comprise: forming a gate metal pattern layer (including: a gate line and a gate of a TFT), an active layer, and a source-drain metal pattern layer (including: a source of the TFT, a drain of the TFT, and a data line), etc. sequentially on the substrate.

The image processing method provided by an embodiment of the present disclosure may be applicable to an image processing system. As shown in FIG. 1, it is a schematic structural diagram of an image processing system to which the technical method provided by an embodiment of the present disclosure is applicable. The image processing system includes an image acquisition apparatus 10 and an image processing apparatus 20; wherein, the image acquisition apparatus 10 and the image processing apparatus 20 are connected via a network.

The image acquisition apparatus 10 may be any apparatus for taking images, for example, AOI detection device. It is understood that the AOI detection device includes a camera or a lens for taking images, so that images can be collected.

Alternatively, in an embodiment of the present disclosure, the image collected by the AOI detection device may be an image collected during the manufacturing procedure of a backplane of a display panel. For example, the collected image may be: an image of any pattern layer such as buffer layer, passivation layer, flat layer, etc.; or an image of active layer, source, drain, gate, etc. in a thin film transistor, or may also be an image of routings, electrodes and connecting holes in a driving circuit, which can be collected as needed, and the embodiment of the present disclosure does not make specific restrictions.

The image processing apparatus 20 can be a computer device such as a terminal device or a server. The terminal device can be a handheld, a notebook, a smart phone, a tablet, or a desktop computer. The server can be one server, or a server cluster composed of multiple servers, or a cloud computing service center.

In an actual implementation, the image acquisition apparatus 10 and the image processing apparatus 20 can be integrated into one computer device, or can be two devices that are independent of each other. The relationship between the image acquisition apparatus 10 and the image processing apparatus 20 has no restrictions in the embodiments of the present disclosure. In the following description, the image acquisition apparatus 10 and the image processing apparatus 20 are taken as two independent devices as an example.

Figure 2:
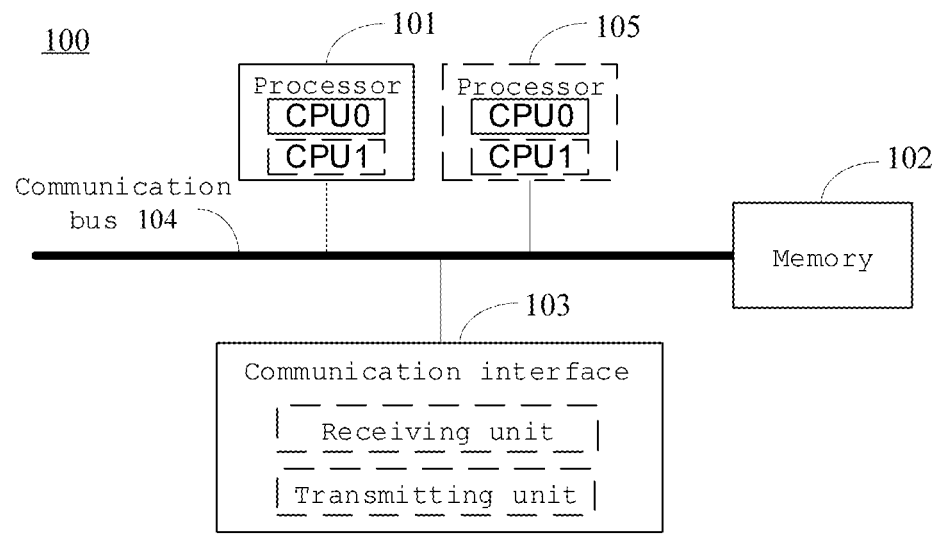
FIG. 2 is a schematic diagram showing the composition of a computer device according to an exemplary embodiment.

Each of above image acquisition apparatus 10 and image processing apparatus 20 can adopt the schematic diagram of the composition of the computer device shown in FIG. 2. FIG. 2 is a schematic diagram of the composition of a computer device 100 provided by an embodiment of the present disclosure. As shown in FIG. 2, the computer device 100 includes, but not limited to: a processor 101, a memory 102, a communication interface 103, and a communication bus 104.

The processor 101, the memory 102, and the communication interface 103 may be connected through the communication bus 104.

The processor 101 can be a central processing unit (CPU), a general-purpose processor network processor (NP), a digital signal processor (DSP), a microprocessor, a microcontroller, a programmable logic device (PLD) or any combination of them. The processor 101 can also be other apparatus with processing functions, such as a circuit, a device, or a software module, without limitation.

The memory 102 is used to store instructions. The instructions can be a computer program.

Wherein, the memory 102 can be a read-only memory (ROM) or other types of static storage devices that can store static information and/or instructions, or it may be a random access memory (RAM) or other types of dynamic storage devices that can store information and/or instructions, or it may also be an electrically erasable programmable read-only memory (EEPROM), a compact disc read-only memory (CD-ROM) or other optical disk storage, optical disc storage (including a compact disc, a laser disc, an optical disc, a digital versatile disc, a Blu-ray disc, etc.), a magnetic disk storage medium or other magnetic storage devices, etc., without limitation.

It should be noted that the memory 102 may exist independently with the processor 101, or may be integrated with the processor 101. The memory 102 may be used to store instructions or program codes or some data etc. The memory 102 may be located in the computer device 100 or outside the computer device 100, which is not limited in the embodiments of the present disclosure. The processor 101 is used to execute instructions stored in the memory 102 to implement the image processing method provided in following embodiments of the present disclosure.

The communication interface 103 uses any apparatus such as a transceiver to communicate with other devices or communication networks, such as Radio Access Network (RAN), Wireless Local Area Networks (WLAN), terminal, and cloud etc. The communication interface 103 can comprise a receiving unit to implement a receiving function, and a transmitting unit to implement a transmitting function.

The communication bus 104 may be an Industry Standard Architecture (ISA) bus, a Peripheral Component Interconnect (PCI) bus, or an Extended Industry Standard Architecture (EISA) bus, etc. The buses can be divided into an address bus, a data bus, a control bus and so on. For ease of representation, only one thick line is used in FIG. 2, but it does not mean that there is only one bus or one type of bus.

In one example, the processor 101 can comprise one or more CPUs, such as CPU0 and CPU1 in FIG. 2.

Figure 3:
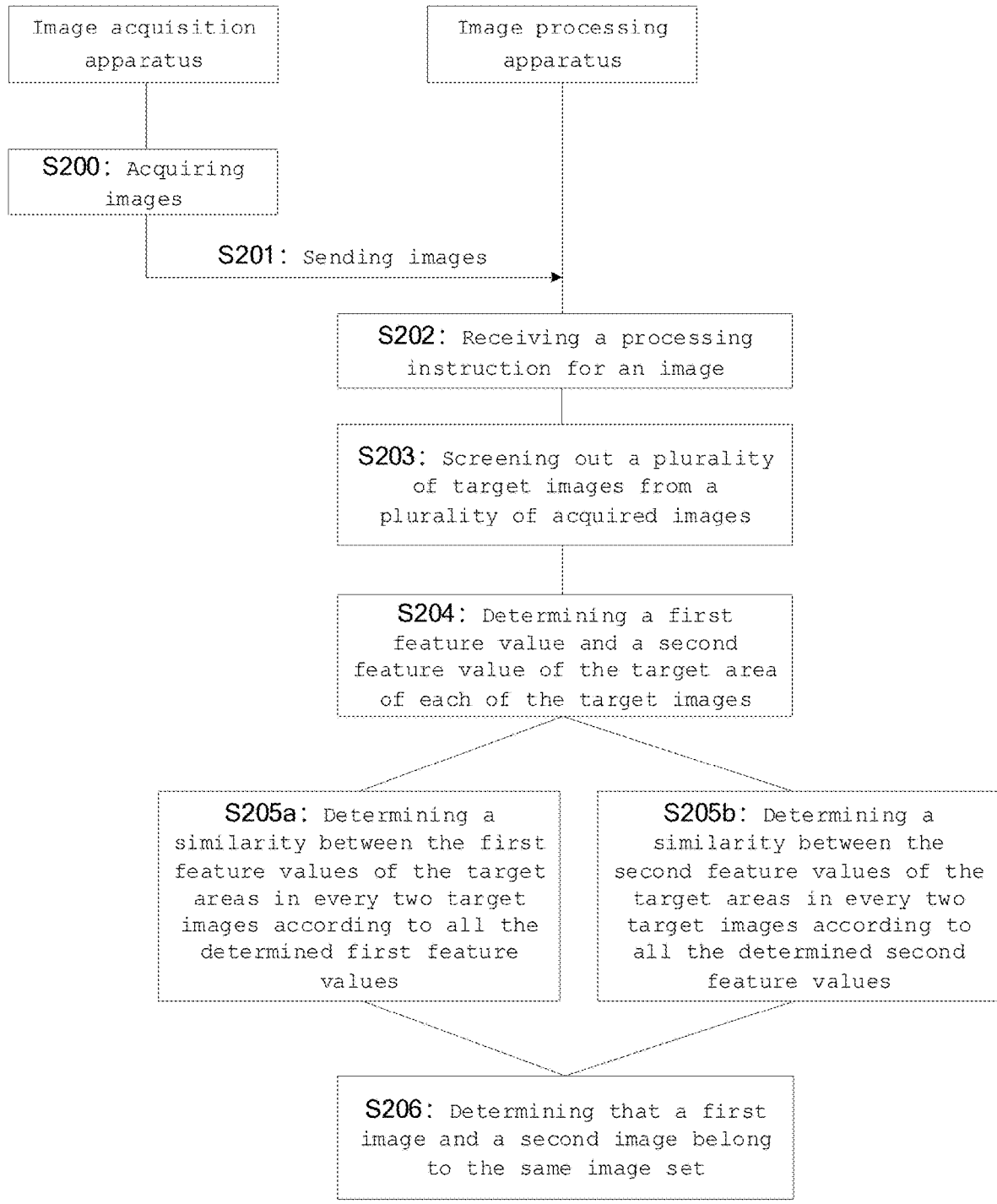
FIG. 3 is a first schematic flowchart showing an image processing method according to an exemplary embodiment.

As one alternative implementation, the computer device 100 comprises a plurality of processors, for example, in addition to the processor 101 in FIG. 3, it may also include a processor 105.

In addition, the actions, terms, etc. involved in various embodiments of the present disclosure can be referred to each other, and are not limited. In the embodiments of the present disclosure, the name of a message or the reference name in a message etc. that is interacted between various devices is just one example, and other names may also be used in specific implementations, which are not limited.

The image processing method provided by an embodiment of the present disclosure will be described in detail below in conjunction with the image processing system shown in FIG. 1.

Before describing the embodiments of the present disclosure, the scenarios involved in the embodiments of the present disclosure will be described first. Specifically, the image acquisition apparatus acquires images, and sends the images acquired by itself to an image processing apparatus, so that the image processing apparatus acquires a plurality of images. In one possible design, before the image processing apparatus receiving a processing instruction for an image, the image acquisition apparatus acquires the images and sends the images acquired by itself to the image processing apparatus; then, the image processing apparatus receives the processing instruction for the image to process the plurality of images. In another possible design, after the image processing apparatus receives the processing instruction for the image, the image acquisition apparatus acquires the images and sends the images acquired by itself to the image processing apparatus, so that the image processing apparatus can process the plurality of images.

In an embodiment of the present disclosure, the image acquisition apparatus first acquires images, and then sends the images to the image processing apparatus. When receiving the processing instruction for the image, the image processing apparatus executes the steps of image processing shown in FIG. 3.

FIG. 3 is a schematic flowchart of an image processing method provided by an embodiment of the disclosure. As shown in FIG. 3, the image processing method comprises the following steps.

At the step S200, the image acquisition apparatus acquires images.

Illustratively, the image acquisition apparatus can be the AOI detection device. The AOI detection device includes a camera, and, for example, the camera may be employed to acquire images.

At the step S201, the image acquisition apparatus sends the images to the image processing apparatus.

For example, the images are input into a first virtual three-dimensional space in the image processing apparatus, and the first virtual three-dimensional space processes the images and converts image information into three-dimensional data, so that the image processing apparatus can perform subsequent steps.

At the step S202, the image processing apparatus receives a processing instruction for an image.

Alternatively, the processing instruction can be a click operation, a double-click operation, a sliding operation, a timing switch, or a switch manually triggered by an operator, which may be specifically determined according to actual requirements, and the embodiment of the present disclosure does not make specific restrictions.

For example, taking the processing instruction as a click operation as an example, the processing instruction can be a click of an operator on an image.

At the step S203, the image processing apparatus screens out a plurality of target images from the plurality of acquired images.

The target image is an image including a target area; the target area includes an area in the target image where the pixel information is non-periodic.

Specifically, the target image includes a plurality of identical and periodically arranged patterns. Illustratively, the patterns are pixel patterns.

The pixel patterns are individual smallest repetitive units distributed along the row direction and along the column direction in an Active Area (AA) of a display substrate. In a case that the display substrate is an array substrate included in an LCD, in each smallest repetitive unit, a pixel electrode and a thin film transistor in connection with the pixel electrode are included; in a case that the display substrate is a driving backplane included in a self-luminous display apparatus (such as an OLED), in each smallest repetitive unit, a pixel circuit that provides a driving signal for each light-emitting unit is included.

In addition, a pixel point is the smallest light-emitting unit of the display screen in a display apparatus, and is composed of at least red, green, and blue pixel units.

Figure 4:
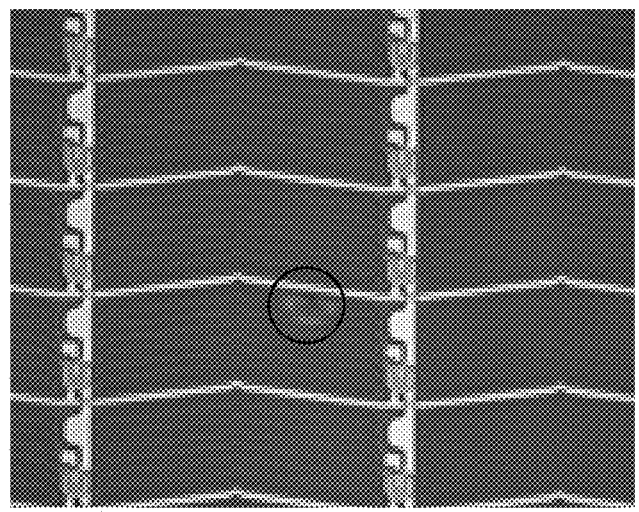
FIG. 4 is a schematic diagram showing a target image according to an exemplary embodiment.

As shown in FIG. 4, the target image includes a plurality of identical and periodically arranged patterns, which can be understood as that: the black area of each smallest repetitive unit along the row direction and the white area of a grid line and a data line in connection with each smallest repetitive unit are arranged repetitively. That is to say, along the row direction, the black area of one smallest repetitive unit and the white area of the gate line and the data line in connection with this smallest repetitive unit are the same as the black area of each of other smallest repetitive units and the white area of the gate line and the data line in connection with a corresponding smallest repetitive units.

The pixel pattern is composed of multiple pixels. By expressing the position, color, brightness and other information of the pixel, a pixel pattern is formed, and an image can be formed by arranging multiple pixel patterns together, which is a target image of the present disclosure. Based on this, the multiple pixel patterns included in the target image are caused to be identical and arranged periodically only when pixel information included in each pixel pattern changes periodically.

It should be noted that pixel information includes a gray-scale value of a pixel or the like.

Based on this, it can be understood that if a target image includes an area where the pixel information is non-periodic (that is, does not change periodically), the area is determined to be a target area; the target area is an area with defect (for example, there is missing, a foreign object, etc.) in the target image.

Alternatively, the image processing apparatus screening out a plurality of target images from a plurality of acquired images comprises: acquiring the pixel information of each image (for example, a gray-scale value of a pixel or the like) by the image processing apparatus, determining an interference fringe of the image according to the pixel information, and filtering out the interference fringe to obtain a filtered image; if the filtered image includes an area where the pixel information is non-periodic, determining the image as the target image. Illustratively, the image processing apparatus employs a pixel recognition algorithm to acquire the pixel information of each image, and then employs the similarity principle to perform a comparison according to the acquired pixel information to determine the interference fringe, and filters out the interference fringe.

It should be noted that, in the embodiment of the present disclosure, the image collected by the AOI detection device has an interference fringe (also referred to as interference factor). Interference fringe is caused by light passing through a grid composed of small liquid crystal pixel points, so the collected image looks like there are distorted fringes.

In addition, those skilled in the art can understand that the interference fringe is a light and dark fringe with periodicity and the interference fringe in the same image includes multiple similar "horizontal" fringes and multiple similar "vertical" fringes. In the present disclosure, employing the similarity principle to perform a comparison means that: the interference fringe of an image is determined according to the similarity between the pixel information and the "horizontal" fringes and the similarity between the pixel information and the "vertical" fringes.

Figure 5:
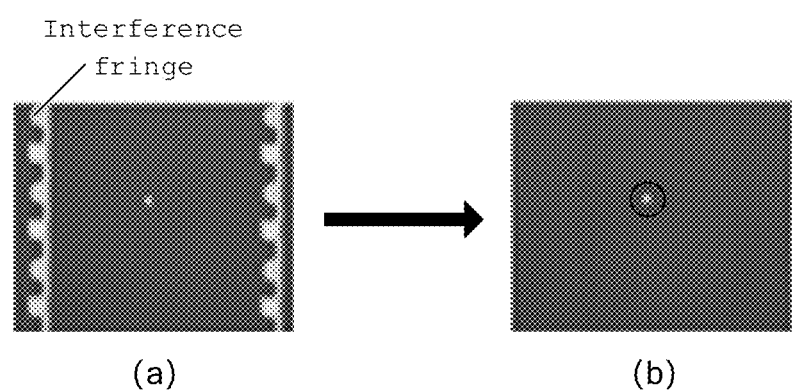
FIG. 5 is a schematic diagram showing a target image obtained by filtering our an original image according to an exemplary embodiment.

For example, as shown in FIG. 5, the image (a) in FIG. 5 is an original image collected by an AOI detection device. As it can be seen from the image (a), the original image includes the interference fringe, and as shown in (b) in FIG. 5, the target image is obtained after the interference fringe is filtered out, wherein the area within the "circle" is the target area included in the target image.

It should be noted that in the embodiment of the present disclosure, filtering out means that the image processing apparatus does not process the area outside the "circle" during subsequent processing of the target image, and only processes the target area (i.e., the area within the "circle"), rather than removing the interference fringe in the image. That is, the target image actually still has the interference fringe.

In addition, it can be understood that each image has multiple "horizontal" fringes and multiple "vertical" fringes. (a) in FIG. 5 only takes the image with two "vertical" fringes as an example, which can be specifically determined according to actual situation.

For example, the screened out plurality of target images can be stored in a second virtual three-dimensional space, and the second virtual three-dimensional space processes the target images and converts the target image information into three-dimensional data, to facilitate the image processing apparatus to perform subsequent steps.

At the step S204, the image processing apparatus determines a first feature value and a second feature value of the target area of each of the target images.

Illustratively, the first feature value is, for example, a plane feature value of the target area, and the second feature value is, for example, a boundary feature value of the target area. Specifically, for example, the first feature value may be pixel values within the target area (the boundary may be contained or not contained), and the second feature value may be pixel values at the boundary of the target area. As can be understood, the target area may have an arbitrary shape.

Alternatively, the first feature value and the second feature value may be a gray-scale value of a pixel or the like, which are not specifically limited in the embodiment of the present disclosure.

In the case that the first feature value is a plane feature value, optionally, a pixel recognition algorithm is employed to acquire information of each pixel in the target area, such as a gray-scale value or the like.

For example, the determined information of the first feature value may be stored in a third virtual three-dimensional space, and the third virtual three-dimensional space converts the information of the first feature value into three-dimensional data, to facilitate the image processing apparatus to perform subsequent steps.

In the case that the second feature value is a boundary feature value, optionally, a Canny edge detection algorithm is employed to acquire the boundary feature value of the target area. The Canny edge detection algorithm comprises: first performing Gaussian smoothing, for example using a Gaussian filter to smooth the image; then using the finite difference of a first-order partial derivative to calculate the amplitude and direction of the gradient; then performing non-maximum suppression on the gradient amplitude; and finally using a dual thresholds algorithm to detect and connect edges.

It should be noted that, in the embodiment of the present disclosure, the specific implementation process of acquiring the boundary feature value by using the Canny edge detection algorithm can refer to related technology, which will not be repeated here.

For example, the determined information of the second feature value may be stored in a fourth virtual three-dimensional space, and the fourth virtual three-dimensional space converts the information of the second feature value into three-dimensional data, to facilitate the image processing apparatus to perform subsequent steps.

At the step S205a, the image processing apparatus determines a similarity between the first feature values of the target areas in every two target images according to all the determined first feature values.

Alternatively, assuming that all target images include image A, image B, image C, and image D, so the similarities include the similarity between the first feature values of the target areas in image A and image B, the similarity between the first feature values of the target areas in image A and image C, the similarity between the first feature values of the target areas in the image A and the image D, the similarity between the first feature values of the target areas in image B and image C, the similarity between the first feature values of the target areas in image B and image D, and the similarity between the first feature values of the target areas in image C and image D.

The above only takes all target images including image A, image B, image C, and image D as an example for illustration. It can be understood that in a case that all target images include N images, then according to all the determined first feature values, it is determined that the number of the similarity between the first feature values of the target areas in every two target images is N×(N−1)/2.

Taking target images including image A and image B as an example, in a third virtual three-dimensional space, according to the first feature value of the target area in image A and the first feature value of the target area in image B, the similarity between the first feature values of the target areas in image A and image B is determined to satisfy following formula:

$$S_\alpha = \frac{\sum_{i=1,j=1}^{z} A_i B_j}{\sqrt{\sum_{i=1}^{z} A_i^2} \sqrt{\sum_{j=1}^{z} B_j^2}};$$

wherein, $A_i$ represents the i-th first feature value of the image A, $B_j$ represents the j-th first feature value of the image B, $1 \leq i \leq z$, $1 \leq j \leq z$;

$$\sum_{i=1,j=1}^{z} A_i B_j$$

represents the sum of z first feature values of the image A and z first feature values of the image B;

$$\sqrt{\sum_{i=1}^{z} A_i^2}$$

represents the arithmetic square root of the sum of z first feature values of the image A, $$\sqrt{\sum_{j=1}^{z} B_j^2}$$

represents the arithmetic square root of the sum of z first feature values of the image B, and $S_\alpha$ is the similarity between the first feature values of the target areas in the image A and the image B.

At the step S205b, the image processing apparatus determines a similarity between the second feature values of the target areas in every two target images according to all the determined second feature values.

Alternatively, assuming that all target images include image A, image B, image C, and image D, so the similarities includes the similarity between the second feature values of the target areas in image A and image B, the similarity between the second feature values of the target areas in image A and image C, the similarity between the second feature values of the target areas in image A and image D, the similarity between the second feature values of the target areas in image B and image C, the similarity between the second feature values of the target areas in image B and image D, and the similarity between the second feature values of the target areas in image C and image D.

The above only takes all target images including image A, image B, image C, and image D as an example for illustration. It can be understood that in a case that all target images include N images, then according to all the determined second feature values, it is determined that the number of the similarity between the second feature values of the target areas in every two target images is N×(N−1)/2.

Taking target images including image A and image B as an example, in a fourth virtual three-dimensional space, according to the second feature value of the target area in image A and the second feature value of the target area in image B, the similarity between the second feature values in the target areas in image A and image B is determined to satisfy following formula:

$$S_\beta = \frac{\sum_{n=1,m=1}^{k} A_n B_m}{\sqrt{\sum_{n=1}^{k} A_n^2} \sqrt{\sum_{m=1}^{k} B_m^2}};$$

wherein, $A_n$ represents the n-th second feature value of the image A, $B_m$ represents the m-th second feature value of the image B, $1 \leq n \leq k$, $1 \leq m \leq k$;

$$\sum_{n=1,m=1}^{k} A_n B_m$$

represents the sum of k second feature values of the image A and k second feature values of the image B;

$$\sqrt{\sum_{n=1}^{k} A_n^2}$$

represents the arithmetic square root of the sum of k second feature values of the image A, $$\sqrt{\sum_{m=1}^{k} B_m^2}$$

represents the arithmetic square root of the sum of k second feature values of the image B, and $S_\beta$ is the similarity between the second feature values of the target areas in the image A and the image B.

At the step S206, the image processing apparatus determines that a first image and a second image belong to the same image set.

Specifically, if a first target similarity, which is the similarity between the first feature values of the target areas in a first image and a second image, is within a first preset range, and a second target similarity, which is the similarity between the second feature values of the target areas in the first image and the second image, is within a second preset range, the image processing apparatus determines that the first image and the second image belong to the same image set.

Alternatively, the first image is an arbitrary image among all target images, the second image is an arbitrary image among all target images, and the first image and the second image are different. For example, the first image is image A in the above embodiment, and the second image is image B in the above embodiment.

It should be noted that the first preset range and the second preset range can be set according to specific needs; in addition, the first preset range and the second preset range can be the same or different, which is not limited in the embodiments of the present disclosure.

Figure 6:
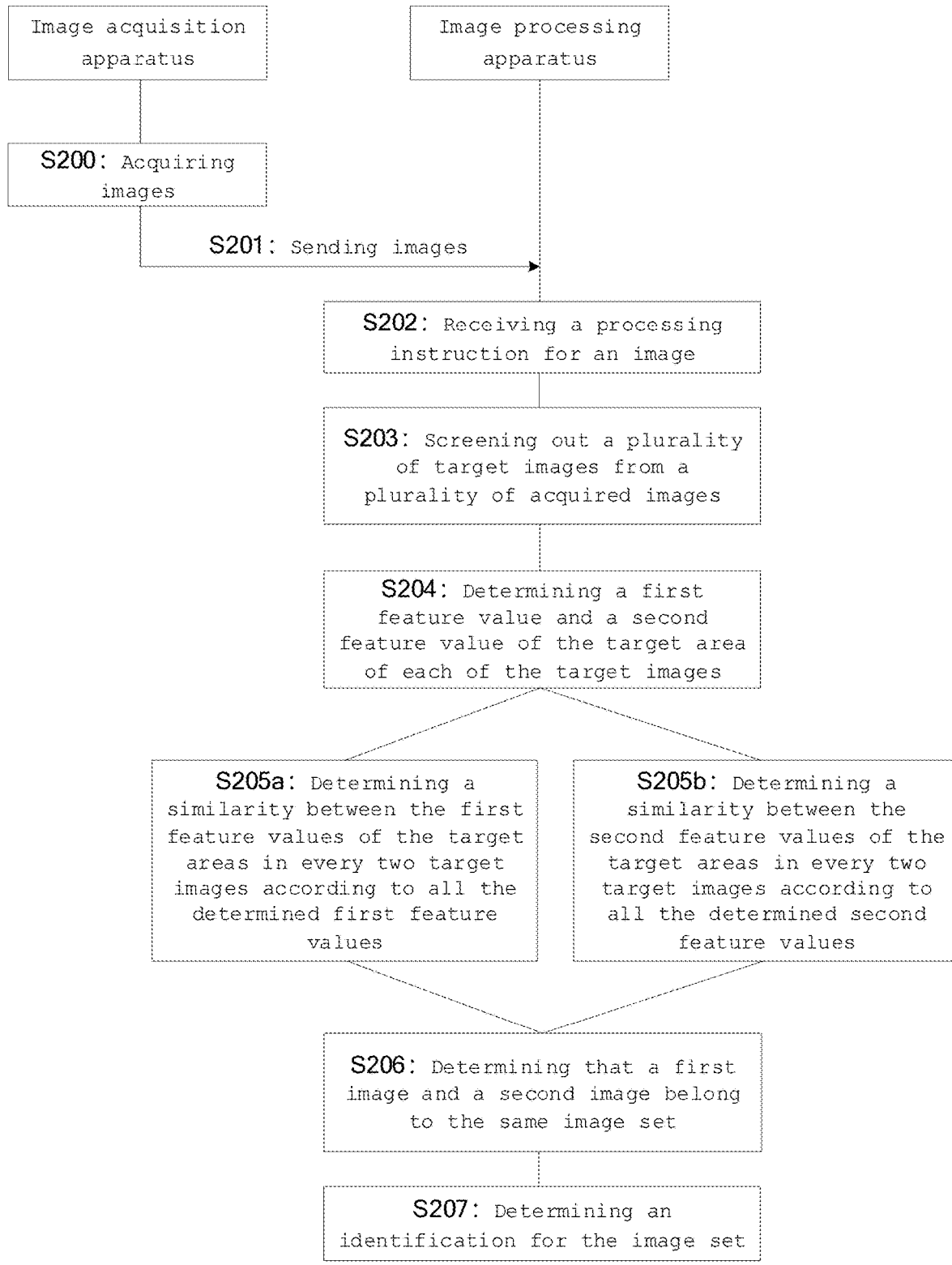
FIG. 6 is a second schematic flowchart showing an image processing method according to an exemplary embodiment.

Alternatively, FIG. 6 is a schematic flowchart of an image processing method provided by an embodiment of the present disclosure. As shown in FIG. 6, the image processing method further comprises:

A step S207, at which the image processing apparatus determines an identification for the image set.

Specifically, the identification for the image set is used to characterize feature information of all target images in the image set.

In one example, the image processing apparatus receives a trigger operation on the image set, and determines the identification for the image set.

Alternatively, the trigger operation can be a click operation, a double-click operation, a sliding operation, etc., which may be specifically determined according to actual requirements, and the embodiment of the present disclosure does not make specific limitations.

For example, taking the trigger operation as a click operation as an example, the trigger operation can be a click of an operator on the image set to determine the identification for the image set.

It should be noted that the image set in the embodiment of the present disclosure may be represented in the form of a folder, or may also be represented in other suitable manners, and the embodiment of the present disclosure does not make specific limitations.

Alternatively, as shown in FIG. 4, FIG. 4 takes a target image included in the same image set being a partial image of a circuit board as an example for illustration. As it can be seen that the target image has a defect in the "circle", and the defect is due to the passivation layer cracking caused during the manufacturing of the passivation layer, resulting in the defect present in the target image. Based on this, the identification for the image set can be determined as PVX Open. For example, when the image set is a folder, the folder can be named as PVX Open.

In the present disclosure, the identification for the image set can be determined according to reference plane feature value and reference edge feature value corresponding to a known defect type. In other words, the identification for the image set can be determined according to reference plane feature value and reference edge feature value corresponding to a known identification. More specifically, in a case that the plane feature values and the edge feature values of the images in the image set (such as the average value of the plane feature values and the average value of the edge feature values) have high similarities with reference plane feature value and reference edge feature value corresponding to a known identification, respectively, the identification for the image set can be determined as the known identification.

The foregoing mainly introduces the solutions provided by the embodiments of the present disclosure from the perspective of interaction between devices. It can be understood that, in order to realize above functions, each device includes a hardware structure and/or software module corresponding to each function. Those skilled in the art should easily realize that, in combination with the algorithm steps of various examples described in the embodiments disclosed herein, the present disclosure can be implemented in the form of hardware or a combination of hardware and computer software. Whether a certain function is executed by hardware or computer software-driven hardware depends on the specific application and design constraint conditions of the technical solution. Professional technicians can use different methods for each specific application to implement the described functions, but such implementations should not be considered as beyond the scope of the present disclosure.

The embodiments of the present disclosure can divide function modules of each device according to the foregoing method examples. For example, various function modules can be divided corresponding to various functions, or two or more functions can be integrated into one processing module. The above integrated modules can be implemented both in the form of hardware and in the form of software function modules. It should be noted that the division of modules in the embodiments of the present disclosure is illustrative, and is only a logical function division, and there may be other division manners in actual implementations.

Figure 7:
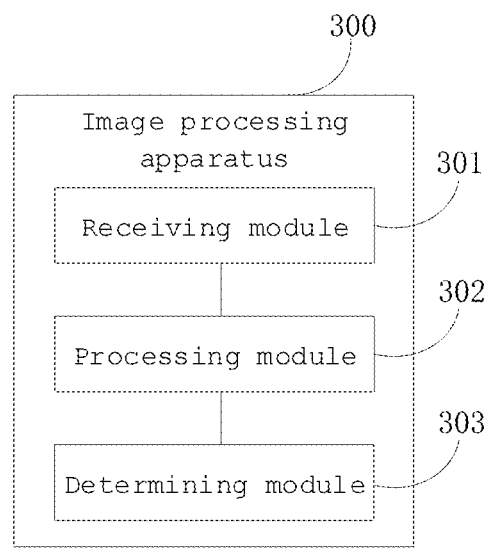
FIG. 7 is a schematic diagram showing a structure of an image processing apparatus according to an exemplary embodiment.

In a case that various function modules being dividing by corresponding various functions is adopted, FIG. 7 shows a schematic structural diagram of an image processing apparatus 300, which can comprise a receiving module 301 and a processing module 302. Illustratively, the image processing apparatus 300 can be a server, or can be a chip applied in a server or other combined devices, components, etc. having these server functions described above.

Specifically, the receiving module 301 is configured to receive a processing instruction for an image. For example, as shown in FIG. 3, the receiving module 301 can be used to execute the step S202.

The processing module 302 is configured to screen out a plurality of target images from the plurality of acquired images. For example, with reference to FIG. 3, the processing module 302 can be used to execute the step S203.

The target image is an image including a target area; the target area includes an area in the target image where the pixel information is non-periodic.

The processing module 302 is further configured to determine a first feature value and a second feature value of a target area of each target image. For example, with reference to FIG. 3, the processing module 302 can be used to execute the step S204.

The processing module 302 is further configured to determine a similarity between the first feature values of the target areas in every two target images according to all the determined first feature values, and to determine a similarity between the second feature values of the target areas in every two target images according to all the determined second feature values. For example, with reference to FIG. 3, the processing module 302 can be used to execute the steps S205a-S205b.

The processing module 302 is further configured to determine that the first image and the second image belong to the same image set. For example, with reference to FIG. 3, the processing module 302 can be used to execute the step S206.

Specifically, if a first target similarity, which is the similarity between the first feature values of the target areas in a first image and a second image, is within a first preset range, and a second target similarity, which is the similarity between the second feature values of the target areas in the first image and the second image, is within a second preset range, it is determined that the first image and the second image belong to the same image set.

Alternatively, the image processing apparatus further comprises a determining module 303, which is configured to determine an identification for the image set. For example, with reference to FIG. 6, the determining module 303 can be used to execute the step S207.

Alternatively, the processing module is further configured to acquire the pixel information of each image; determine an interference fringe of the image according to the pixel information, and filter out the interference fringe to obtain a filtered image; and if the filtered image includes the area where the pixel information is non-periodic, determine the image as the target image.

Alternatively, the processing module 302 is further configured to, for image A and image B, according to the first feature value of the target area in the image A and the first feature value of the target area in the image B, determine a similarity between the first feature values of the target areas in the image A and the image B to satisfy following formula:

$$S_\alpha = \frac{\sum_{i=1,j=1}^{z} A_i B_j}{\sqrt{\sum_{i=1}^{z} A_i^2} \sqrt{\sum_{j=1}^{z} B_j^2}};$$

wherein, $A_i$ represents the i-th first feature value of the image A, $B_j$ represents the j-th first feature value of the image B, $1 \leq i \leq z$, $1 \leq j \leq z$;

$$\sum_{i=1,j=1}^{z} A_i B_j$$

represents the sum of z first feature values of the image A and z first feature values of the image B;

$$\sqrt{\sum_{i=1}^{z} A_i^2}$$

represents the arithmetic square root of the sum of z first feature values of the image A, $$\sqrt{\sum_{j=1}^{z} B_j^2}$$

represents the arithmetic square root of the sum of z first feature values of the image B, and $S_\alpha$ is the similarity between the first feature values of the target areas in the image A and the image B.

Alternatively, the processing module 302 is further configured to, for image A and image B, according to the second feature value of the target area in the image A and the second feature value of the target area in the image B, determine a similarity between the second feature values of the target areas in the image A and the image B to satisfy following formula:

$$S_\beta = \frac{\sum_{n=1,m=1}^{k} A_n B_m}{\sqrt{\sum_{n=1}^{k} A_n^2} \sqrt{\sum_{m=1}^{k} B_m^2}};$$

wherein, $A_n$ represents the n-th second feature value of the image A, $B_m$ represents the m-th second feature value of the image B, $1 \leq n \leq k$, $1 \leq m \leq k$;

$$\sum_{n=1,m=1}^{k} A_n B_m$$

represents the sum of k second feature values of the image A and k second feature values of the image B;

$$\sqrt{\sum_{n=1}^{k} A_n^2}$$

represents the arithmetic square root of the sum of k second feature values of the image A, $$\sqrt{\sum_{m=1}^{k} B_m^2}$$

represents the arithmetic square root of the sum of k second feature values of the image B, and $S_\beta$ is the similarity between the second feature values of the target areas in the image A and the image B.

It should be noted that the examples of the functions implemented by various modules of the image processing apparatus 300 shown in FIG. 7 and beneficial effects produced can be referred to the examples of the image processing method and the beneficial effects in foregoing embodiments, which will not be repeated here.

In actual implementation, the receiving module 301, the processing module 302, and the determining module 303 can be implemented by the processor 101 shown in FIG. 2 invoking the program code in the memory 102. The specific execution process thereof can be referred to the description of the image processing methods shown in FIG. 3 and FIG. 6, which will not be repeated here.

The embodiment of the present disclosure also provides a computer-readable storage medium. All or part of the processes in foregoing method embodiments can be done by a computer program instructing a relevant hardware. The program can be stored in above computer-readable storage medium. When the program is executed, it can comprise processes of foregoing method embodiments. The computer-readable storage medium may be an internal storage unit of the image processing apparatus (including the data sending end and/or the data receiving end) of any of foregoing embodiments, such as a hard disk or a memory of the image processing apparatus. Above computer-readable storage medium may also be an external storage device of above image processing apparatus, such as a plug-in hard disk, a smart media card (SMC), or a secure digital (SD) card, a flash card, etc. equipped on the image processing apparatus. Further, the above computer-readable storage medium may also include both an internal storage unit of the aforementioned communication apparatus and an external storage device. The above computer-readable storage medium is used to store the aforementioned computer program and other programs and data required by the aforementioned terminal. The above computer-readable storage medium can also be used to temporarily store data that has been output or will be output.

With the description of above implementations, those skilled in the art can clearly understand that, for the convenience and brevity of the description, only the division of the aforementioned function modules is used as an example for illustration. In practical applications, the aforementioned functions can be allocated to be done by different function modules as required, that is, the internal structure of the apparatus is divided into different function modules to complete all or part of functions described above.

In the several embodiments provided in the present disclosure, it should be understood that the disclosed apparatus and method may be implemented in other ways. For example, the apparatus embodiments described above are merely illustrative. For example, the division of the modules or units is only a logical function division. In actual implementation, there may be other division manners, for example, multiple units or components can be combined or integrated into another apparatus, or some features can be omitted or not executed. In addition, the displayed or discussed mutual coupling or direct coupling or communication connection may be indirect coupling or communication connection through some interfaces, apparatus or units, and may be in electrical, mechanical or other forms.

The units described as separate parts may or may not be physically separate, and the parts displayed as units may be one physical unit or multiple physical units, that is, they may be located in one place, or they may be distributed to multiple different places. Some or all of the units may be selected according to actual needs to achieve the objectives of the solutions of the embodiments.

In addition, various functional units in various embodiments of the present disclosure may be integrated into one processing unit, or each unit may physically exist alone, or two or more units may be integrated into one unit. The above-mentioned integrated unit can be implemented in both the form of hardware and the form of software function unit.

If the integrated unit is implemented in the form of a software function unit and sold or used as an independent product, it can be stored in a readable storage medium. Based on this understanding, the technical solutions of the embodiments of the present disclosure are essentially either the part that contributes to the prior art, or all or some of the technical solutions can be embodied in the form of a software product, and the software product is stored in a storage medium, which including several instructions to make a device (may be a single-chip microcomputer, a chip, etc.) or a processor execute all or some of the steps of the methods described in the various embodiments of the present disclosure. While the aforementioned storage media include medium such as a U disk, a mobile hard disk, a ROM, a RAM, a magnetic disk or an optical disk etc. that can store program codes.

The embodiments of the present disclosure also provide a computer program product containing instructions, which, when being executed by a computer, cause the computer to execute any one of the methods in foregoing embodiments. The computer program product includes one or more computer instructions. When the computer program instructions are loaded and executed on the computer, the processes or functions described in the embodiments of the present disclosure are produced in whole or in part. The computer can be a general-purpose computer, a dedicated computer, a computer network, or other programmable apparatus. The computer instructions may be stored in a computer-readable storage medium, or transmitted from one computer-readable storage medium to another computer-readable storage medium. For example, the computer instructions may be transmitted from a website, computer, server, or data center through wire (such as coaxial cable, optical fiber, digital subscriber line (DSL)) or wireless (such as infrared, radio, microwave, etc.) to another website, computer, server or data center. The computer-readable storage medium can be any available medium that can be accessed by a computer or can be a data storage device comprising one or more servers, data centers etc. that can be integrated with the medium. Available medium may be a magnetic medium (for example, a floppy disk, a hard disk, and a magnetic tape), an optical medium (for example, a DVD), or a semiconductor medium (for example, a solid state disk (SSD)) and the like.

It should be noted that the foregoing devices for storing computer instructions or computer programs provided in the embodiments of the present disclosure, such as but not limited to, the foregoing memory, computer-readable storage medium, and chip, etc., are all non-transitory.

Finally, it should be noted that the above embodiments are only used to illustrate the technical solutions of the present disclosure, and are not used to limit thereof; although the present disclosure has been described in detail with reference to the foregoing embodiments, those of ordinary skill in the art should understand that: they can still modify the technical solutions recorded in the foregoing embodiments, or replace some of the technical features thereof with equivalent; while these modifications or replacements do not cause the essence of corresponding technical solutions to depart from the spirit and scope of the technical solutions of the embodiments of the present disclosure.

What is claimed is:

1. An image processing method applied in a computer device, the image processing method comprises:
   receiving a processing instruction for an image;
   screening out a plurality of target images from a plurality of acquired images, the target image being an image including a target area in which pixel information is non-periodic;
   determining a first feature value and a second feature value of the target area of each of the target images;
   determining a similarity between the first feature values of the target areas in every two target images according to all the determined first feature values, and determining a similarity between the second feature values of the target areas in every two target images according to all the determined second feature values; and
   if a first target similarity, which is the similarity between the first feature values of the target areas in a first image and a second image, is within a first preset range, and a second target similarity, which is the similarity between the second feature values of the target areas in the first image and the second image, is within a second preset range, determining that the first image and the second image belong to the same image set,
   wherein the screening out the plurality of target images from the plurality of acquired images comprises:
   acquiring the pixel information of each image;
   determining an interference fringe of the image according to the pixel information, and filtering out the interference fringe to obtain a filtered image; and
   if the filtered image includes the area where the pixel information is non-periodic, determining the image as the target image.

2. The image processing method according to claim 1, wherein the image processing method further comprises:
   determining an identification for the image set.

3. The image processing method according to claim 1, wherein the determining a similarity between the first feature values of the target areas in every two target images according to all the determined first feature values comprises:
   for image A and image B, according to the first feature value of the target area in the image A and the first feature value of the target area in the image B, determining a similarity between the first feature values of the target areas in the image A and the image B to satisfy following formula:

$$S_\alpha = \frac{\sum_{i=1,j=1}^{z} A_i B_j}{\sqrt{\sum_{i=1}^{z} A_i^2} \sqrt{\sum_{j=1}^{z} B_j^2}};$$

wherein, $A_i$ represents the i-th first feature value of the image A, $B_j$ represents the j-th first feature value of the image B, $1 \le i \le z$, $1 \le j \le z$;

$$\sum_{i=1,j=1}^{z} A_i B_j$$

represents the sum of z first feature values of the image A and z first feature values of the image B;

$$\sqrt{\sum_{i=1}^{z} A_i^2}$$

represents the arithmetic square root of the sum of z first feature values of the image A, $$\sqrt{\sum_{j=1}^{z} B_j^2}$$

represents the arithmetic square root of the sum of z first feature values of the image B, and $S_\alpha$ is the similarity between the first feature values of the target areas in the image A and the image B.

4. The image processing method according to claim 1, wherein the determining a similarity between the second feature values of the target areas in every two target images according to all the determined second feature values comprises:
   for image A and image B, according to the second feature value of the target area in the image A and the second feature value of the target area in the image B, determining a similarity between the second feature values of the target areas in the image A and the image B to satisfy following formula:

$$S_\beta = \frac{\sum_{n=1,m=1}^{k} A_n B_m}{\sqrt{\sum_{n=1}^{k} A_n^2} \sqrt{\sum_{m=1}^{k} B_m^2}};$$

wherein, $A_n$ represents the n-th second feature value of the image A, $B_m$ represents the m-th second feature value of the image B, $1 \le n \le k$, $1 \le m \le k$;

$$\sum_{n=1,m=1}^{k} A_n B_m$$

represents the sum of k second feature values of the image A and k second feature values of the image B;

$$\sqrt{\sum_{n=1}^{k} A_n^2}$$

represents the arithmetic square root of the sum of k second feature values of the image A, $$\sqrt{\sum_{m=1}^{k} B_m^2}$$

represents the arithmetic square root of the sum of k second feature values of the image B, and $S_\beta$ is the similarity between the second feature values of the target areas in the image A and the image B.

5. The image processing method according to claim 1, wherein the plurality of acquired images include an image of a product obtained by forming at least one pattern layer on a substrate, and wherein the first feature value includes a plane feature value, and the second feature value includes an edge feature value.

6. An image processing apparatus applied in a computer device, the image processing apparatus comprising:
 a receiving module configured to receive a processing instruction for an image; and
 a processing module configured to screen out a plurality of target images from a plurality of acquired images, the target image being an image including a target area in which pixel information is non-periodic;
 wherein the processing module is further configured to determine a first feature value and a second feature value of the target area of each of the target images;
 the processing module is further configured to determine a similarity between the first feature values of the target areas in every two target images according to all the determined first feature values, and determine a similarity between the second feature values of the target areas in every two target images according to all the determined second feature values; and
 the processing module is further configured to, if a first target similarity, which is the similarity between the first feature values of the target areas in a first image and a second image, is within a first preset range, and a second target similarity, which is the similarity between the second feature values of the target areas in the first image and the second image, is within a second preset range, determine that the first image and the second image belong to the same image set,
 wherein the processing module is further configured to:
 acquire the pixel information of each image;
 determine an interference fringe of the image according to the pixel information, and filter out the interference fringe to obtain a filtered image; and
 if the filtered image includes the area where the pixel information is non-periodic, determine the image as the target image.

7. The image processing apparatus according to claim 6, wherein the image processing apparatus further comprises:
a determining module;
 Wherein the determining module is configured to determine an identification for the image set.

8. The image processing apparatus according to claim 6, wherein the processing module is further configured to, for image A and image B, according to the first feature value of the target area in the image A and the first feature value of the target area in the image B, determine a similarity between the first feature values of the target areas in the image A and the image B to satisfy following formula:

$$S_\alpha = \frac{\sum_{i=1,j=1}^{z} A_i B_j}{\sqrt{\sum_{i=1}^{z} A_i^2}\sqrt{\sum_{j=1}^{z} B_j^2}};$$

wherein, $A_i$ represents the i-th first feature value of the image A, $B_j$ represents the j-th first feature value of the image B, $1 \le i \le z$, $1 \le j \le z$;

$$\sum_{i=1,j=1}^{z} A_i B_j$$

represents the sum of z first feature values of the image A and z first feature values of the image B;

$$\sqrt{\sum_{i=1}^{z} A_i^2}$$

represents the arithmetic square root of the sum of z first feature values of the image A, $$\sqrt{\sum_{j=1}^{z} B_j^2}$$

represents the arithmetic square root of the sum of z first feature values of the image B, and $S_\alpha$ is the similarity between the first feature values of the target areas in the image A and the image B.

9. The image processing apparatus according to claim 6, wherein the processing module is further configured to, for image A and image B, according to the second feature value of the target area in the image A and the second feature value of the target area in the image B, determine a similarity between the second feature values of the target areas in the image A and the image B to satisfy following formula:

$$S_\beta = \frac{\sum_{n=1,m=1}^{k} A_n B_m}{\sqrt{\sum_{n=1}^{k} A_n^2}\sqrt{\sum_{m=1}^{k} B_m^2}};$$

wherein, $A_n$ represents the n-th second feature value of the image A, $B_m$ represents the m-th second feature value of the image B, $1 \le n \le k$, $1 \le m \le k$;

$$\sum_{n=1,m=1}^{k} A_n B_m$$

represents the sum of k second feature values of the image A and k second feature values of the image B;

$$\sqrt{\sum_{n=1}^{k} A_n^2}$$

represents the arithmetic square root of the sum of k second feature values of the image A, $$\sqrt{\sum_{m=1}^{k} B_m^2}$$

represents the arithmetic square root of the sum of k second feature values of the image B, and $S_\beta$ is the similarity between the second feature values of the target areas in the image A and the image B.

10. The image processing apparatus according to claim 6, wherein the acquired plurality of images include an image of a product obtained by forming at least one pattern layer on a substrate, and wherein the first feature value includes a plane feature value, and the second feature value includes an edge feature value.

11. A computer device, comprising: one or more processors, and a memory; the processors being coupled to the memory; the memory being used to store computer program code, and the computer program code including computer executable instructions;

wherein, the computer executable instructions, when being executed by the processors, cause the computer device to execute the image processing method according to claim 1.

12. A computer device, comprising: one or more processors, and a memory; the processors being coupled to the memory; the memory being used to store computer program code, and the computer program code including computer executable instructions;

wherein, the computer executable instructions, when being executed by the processors, cause the computer device to execute the image processing method according to claim 2.

13. A computer device, comprising: one or more processors, and a memory; the processors being coupled to the memory; the memory being used to store computer program code, and the computer program code including computer executable instructions;

wherein, the computer executable instructions, when being executed by the processors, cause the computer device to execute the image processing method according to claim 3.

14. A computer device, comprising: one or more processors, and a memory; the processors being coupled to the memory; the memory being used to store computer program code, and the computer program code including computer executable instructions;

wherein, the computer executable instructions, when being executed by the processors, cause the computer device to execute the image processing method according to claim 4.

15. A non-transitory computer-readable storage medium having stored thereon computer instructions or a program, which, when being executed by a computer, cause(s) the computer to execute the image processing method according to claim 1.

16. An image processing system comprising the image processing apparatus according to claim 6.

* * * * *